United States Patent [19]

Consales et al.

[11] Patent Number: 4,517,744
[45] Date of Patent: May 21, 1985

[54] COMPLIANT ASSEMBLY SYSTEM WITH FORCE SENSOR MEMBERS

[75] Inventors: Emanuel J. Consales, Winchester; Anthony Kondoleon, Tewksbury, both of Mass.

[73] Assignee: The Charles Stark Draper Laboratory, Inc., Cambridge, Mass.

[21] Appl. No.: 581,796

[22] Filed: Feb. 21, 1984

[51] Int. Cl.³ ........................ G01B 5/25; G01B 7/31
[52] U.S. Cl. ........................ 33/169 C; 33/185 R; 33/550; 33/560
[58] Field of Search ............ 33/169 R, 169 C, 172 D, 33/174 Q, 174 L, 185 R, 189, 191, 172 E; 29/406, 407

[56] References Cited

U.S. PATENT DOCUMENTS

| | | | |
|---|---|---|---|
| 4,060,906 | 12/1977 | Heizmann | 33/172 D X |
| 4,098,001 | 7/1978 | Watson | 33/185 R X |
| 4,155,169 | 5/1979 | Drake et al. | 33/185 R X |
| 4,316,329 | 2/1982 | Watson | 33/172 D X |
| 4,337,579 | 7/1982 | De Fazio | 33/169 C |
| 4,400,885 | 8/1983 | Consales | 33/169 C X |

Primary Examiner—Robert S. Ward
Attorney, Agent, or Firm—Joseph S. Iandiorio; William E. Noonan

[57] ABSTRACT

A compliant assembly including a remote center compliance device having first and second interconnected compliant sections. The first compliant section is interconnected with a support member; a tool holder mechanism is disposed within the remote center compliance device and is interconnected with the second compliant section; a force sensor system including a plurality of sensor members adjacent to the remote center compliance device extends from a support member to a mounting frame, each sensor member includes one force sensor for sensing the force applied through the tool holder mechanism and remote center compliance device.

6 Claims, 11 Drawing Figures

COMPLIANT ASSEMBLY SYSTEM WITH FORCE SENSOR MEMBERS

FIELD OF INVENTION

This invention relates to a compliant assembly system which contains a tool holder mechanism and is supported by the elements of a force sensing system.

BACKGROUND OF INVENTION

Remote center compliance devices such as those disclosed in U.S. Pat. Nos. 4,098,001, 4,155,169 and 4,337,579, and especially well suited for assembly and fabrication tasks. In high tolerance, clean room and vacuum chamber applications, such as used in gyroscope assembly, the parts to be assembled are very delicate and can tolerate only the slightest of forces in assembly. In this environment, force sensors are used with the remote center compliance device in order to monitor the force applied to the parts. In addition, there is required a tool holder for holding a number of different tools so that all the different assembly operations can be accomplished using the same device, without removing it from the clean room or vacuum environment, by simply changing the tools. However, in such environments the space is limited and the stacking of a tool holder on a remote center compliance device, which is in turn mounted on a force sensor, is unworkable. In addition, the weight of three components is substantial and necessitates a stronger assembly machine capable of applying greater forces, which is inconsistent with the need for very low force operations required for the assembly of the delicate parts.

SUMMARY OF INVENTION

It is therefore an object of this invention to provide an improved compliant assembly system.

It is a further object of this invention to provide such a compliant assembly system which is more compact, allowing for a softer, more controllable compliance for sensitive applications.

It is a further object of this invention to provide such a compliant assembly system which includes the force sensing, remote center compliance and tool changing functions in a single unit.

It is a further object of this invention to provide such a compliant assembly system which is smaller and can be used for assembly in restricted volumes.

It is a further object of this invention to provide such a compliant assembly system which is lighter and can be driven by an assembly machine of lower force output, better suited for delicate assembly tasks.

It is a further object of this invention to provide such a compliant assembly system which uses the support structure of a remote center compliance device in a force sensing system.

The invention results from the realization that a truly compact compliant assembly system for delicate, precise applications can be made by combining a remote center compliance device, a tool holder mechanism, and a force sensing system in a single unit with the support structure of the remote center compliance device also functioning as the force sensing system and the tool holder being disposed within the remote center compliance device.

The invention features a compliant assembly system including a remote center compliance device, a tool holder mechanism and a force sensor system. The remote center compliance device has first and second interconnected compliance sections. The first compliance section is interconnected with a support member. The tool holder mechanism is disposed within the remote center compliance device and is interconnected with the second compliance section. The force sensor system includes a plurality of sensor members adjacent to the remote center compliance device and extending from the support member to a mounting frame. Each sensor member includes at least one force sensor for sensing the force applied through the tool holder mechanism and remote center compliance device.

In a preferred embodiment, the sensor members are equally spaced about the remote center compliance device, and there are three such sensor members. The remote center compliance device may have a central longitudinal axis and the sensor members may be parallel to it, with the tool holder mechanism mounted along it. One of the first and second compliance sections may include a plurality of elements extending along conical radii of the remote center compliance device, and the tool holder mechanism may be disposed within the conical radii.

DISCLOSURE OF PREFERRED EMBODIMENT

Other objects, features and advantages will occur from the following description of a preferred embodiment and the accompanying drawings, in which.

Figure 1:
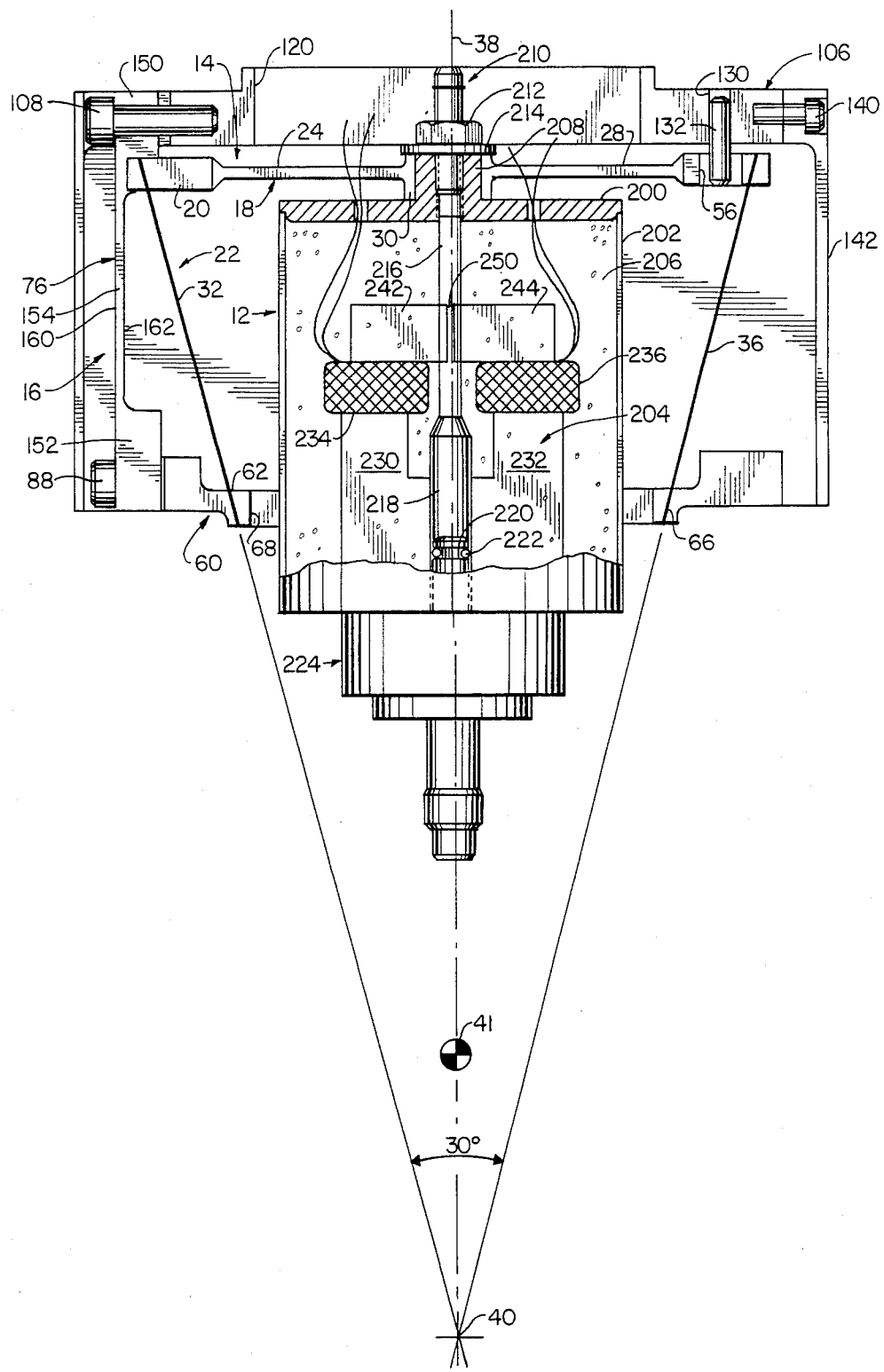
FIG. 1 is a broken away sectional view of a compliant assembly system according to this invention.
Figure 2:
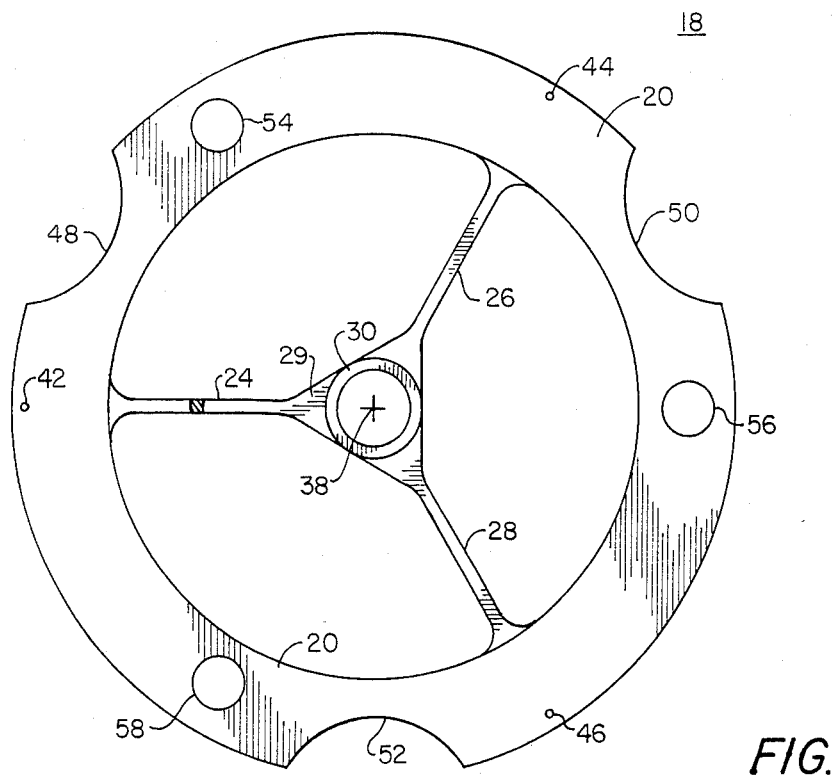
FIG. 2 is a plan view of a compliant section of FIG. 1.

There is shown in FIG. 1 a compliant assembly system 10 according to this invention including a tool holder mechanism 12 carried by a remote center compliance (RCC) device 14, whose support structure includes force sensing mechanism 16. RCC device 14 includes a compliant section 18 having a circumferential portion 20 which interconnects with compliant section 22. Compliant section 18, FIG. 2, includes three deformable sections 24, 26, 28, which interconnect rigid circumferential portion 20 with center section 29 and collar 30, which supports tool holder mechanism 12. Compliant section 22, FIG. 1, includes three wires 32, 34, (not visible) and 36, equally circumferentially spaced about the longitudinal axis 38 of RCC device 14, and lying along conical radii extending from center 40, wires 32, 34 and 36 are fastened in holes 42, 44 and 46 of circumferential portion 20. The combination of compliant sections 18 and 22 establish a remote center of compliance 41. Circumferential portion 20 also includes three arcuate recesses 48, 50, and 52, for accommodating force sensor arms, and three holes 54, 56, and 58 for accommodating limiting pins.

Figure 3:
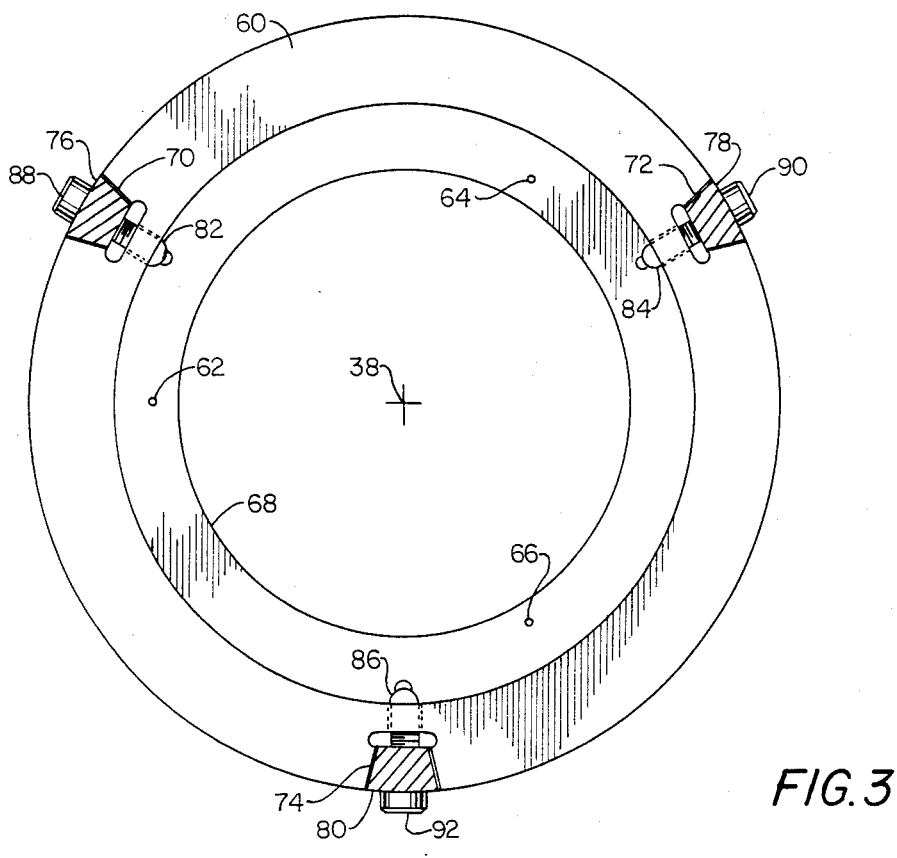
FIG. 3 is a plan view of the interface plate of FIG. 1.

Wires 32, 34 and 36, FIG. 1, are fastened to interface plate 60 in holes 62, 64, 66, FIG. 3. Interface plate 60 also includes an enlarged central hole 68 for accommodating tool holder mechanism 12, and three wedge-shaped recesses 70, 72 and 74, which receive three force sensor members 76, 78, and 80, shown in position in cross section. Threaded holes 82, 84 and 86 are provided to receive screws 88, 90 and 92.

Figure 4:
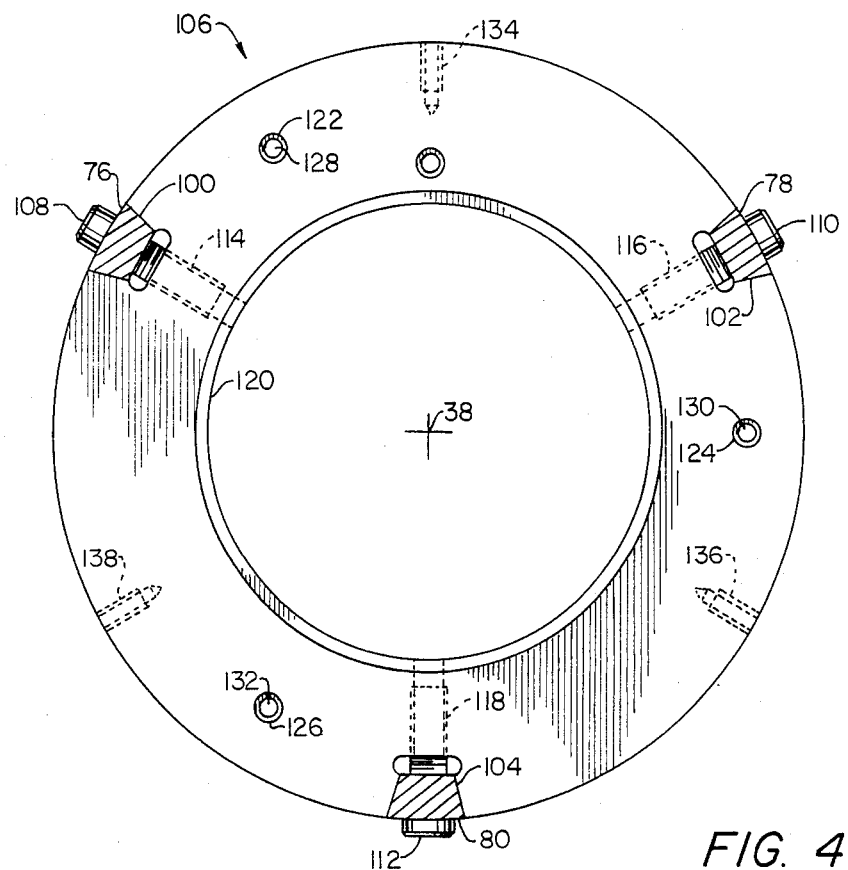
FIG. 4 is a plan view of the base plate of FIG. 1.

The upper ends of arms 76, 78 and 80 are received in similar recesses 100, 102 and 104 of base plate 106, FIG. 4, where they are fastened by means of screws 108, 110, 112, received in threaded holes 114, 116 and 118. Base plate 106 also includes an enlarged central hole 120, three holes 122, 124 and 126 for receiving force-fitted limiting pins 128, 130 and 132, and three threaded holes 134, 136 and 138, for receiving three screws 140, FIG. 1, which fasten protective cylindrical sleeve 142 to base plate 106. Limiting pins 128, 130, 132, FIG. 4, cooperate with holes 54, 56, 58 of FIG. 2 to prevent rotation of the parts.

Figure 5:
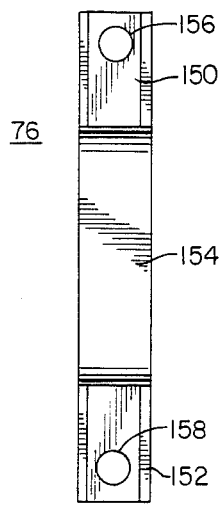
FIG. 5 is a rear elevational view of the force sensing arm of FIG. 1.
Figure 6:
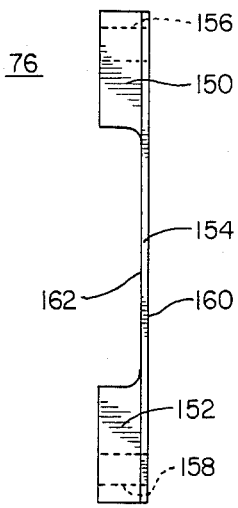
FIG. 6 is a side elevational view of the arm of FIG. 5.
Figure 7:
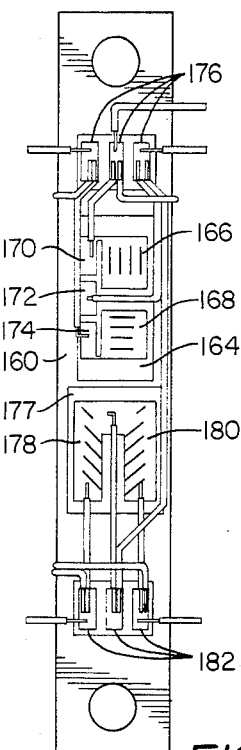
FIG. 7 is a front elevational view of the arm of FIGS. 5 and 6 showing the placement of strain gauges.
Figure 8:
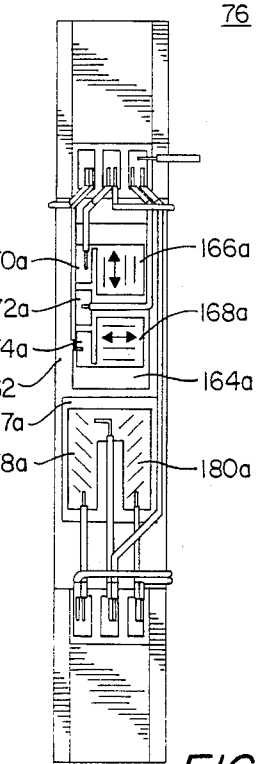
FIG. 8 is a rear elevational view of the arm of FIG. 7 showing the placement of the strain gauges.

Force sensing arms 76, 78 and 80 form a part of the support structure of the RCC device and eliminate the need for the conventional cylindrical support structure, and also function as the force sensing mechanism according to this invention. Each force sensing arm, as illustrated with respect to arm 76 in FIGS. 5 and 6, includes upper and lower wedge portions 150, 152, and a flat central portion 154. The force sensing arm is rigid and senses the forces without deflection using force sensing gauges on its front face 160 and rear face 162. The arrangement of the strain gauges on arm 76 is shown in FIGS. 7 and 8, where front face 160 includes an extension chip 164 having vertical, 166, and horizontal, 168, strain gauges which are interconnected on chip 164 with contact pads 170, 172 and 174 that interconnect with external contact pads 176 and with similar contact pads 170a, 172a and 174a, which serve strain gauges 166a and 168a of chip 164a on rear face 162, FIG. 8, so that together the four strain gauges 166a and 168a form a Wheatstone bridge. Shear gauge chip 177, FIG. 7, includes two shear strain gauges 178 and 180 interconnected with external pads 182. Shear strain gauges 178 and 180 on the front face of arm 76 combine with shear strain gauges 178a and 180a on the rear face 162 of arm 76 to form a Wheatstone bridge.

Tool mechanism 12, FIG. 1, includes a cover plate 200, to which is fastened a cylindrical housing 202 containing magnet assembly 204 in potting compound 206. Cover 200 includes a neck 208 which is received in collar 30 and is bored and threaded to receive a conventional air inlet fitting 210, complete with integral nut 212 and washer 214. A bore 216 extends from the inner end of fitting 210 through potting compound 206 and magnet assembly 204 to enlarge bore 218, which receives sealing "O" ring 222 on the end 220 of tool 224, which is pneumatically operated by air pressure in bores 216 and 218 provided through inlet 210.

Figure 9:
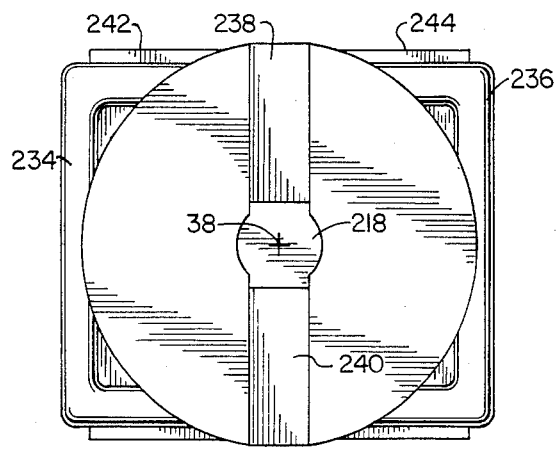
FIG. 9 is a bottom view of the magnet assembly of FIG. 1.
Figure 10:
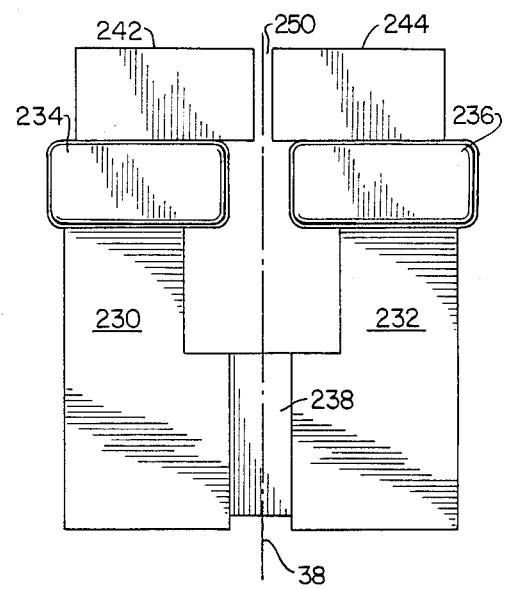
FIG. 10 is a side elevational view of the magnet assembly of FIG. 9.
Figure 11:
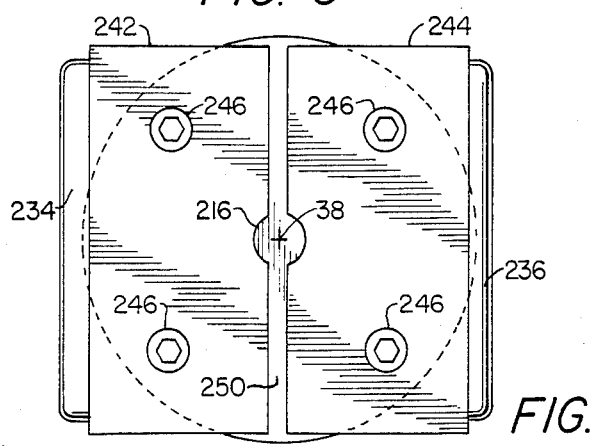
FIG. 11 is a top view of the magnet assembly of FIG. 9.

Magnet assembly 204, FIG. 1 and FIGS. 9, 10 and 11, includes two semicylindrical magnetic members 230, 232, FIG. 9, which carry electromagnetic coils 234, 236 at their upper ends and hold between them permanent magnets 238, 240, FIGS. 9 and 10. Pole pieces 242, 244, are mounted to the tops of magnetic members 230 and 232 by means of socket head screws 246, FIG. 11. An air gap 250 is established between pole pieces 242 and 244 to adjust the holding force of the permanent magnets 238 and 240 with respect to the end 220 of tool 224.

In operation, permanent magnets 238 and 240 have sufficient holding power to hold end 220 of tool 224 in position. When it is desired to replace tool 224, electromagnets 234 and 236 are energized to provide a bucking flux opposing that of permanent magnets 238 and 240, overcoming their holding power and allowing tool 224 to be withdrawn. After a new tool is inserted, the electromagnetic coils 234 and 236 are de-energized and the permanent magnet holding force once again grips tool 224.

Other embodiments will occur to those skilled in the art and are within the following claims:

What is claimed is:

1. A compliant assembly system comprising:
 a remote center compliance device having first and second interconnected compliant sections, said first compliant section being interconnected with a support member;
 a tool holder mechanism disposed within said remote center compliance device and interconnected with said second compliant section; and
 a force sensor system including a plurality of sensor members adjacent to said remote center compliance device and extending from said support member to a mounting frame, each said sensor member including at least one force sensor for sensing the force applied through said tool holder mechanism and remote center compliance device.

2. The system of claim 1 in which said sensor members are equally spaced about said remote center compliance device.

3. The system of claim 1 in which there are three said sensor members.

4. The system of claim 1 in which said remote center compliance device has a central longitudinal axis and said sensor members are parallel to it.

5. The system of claim 1 in which said remote center compliance device has a central longitudinal axis and said tool holder mechanism is mounted along it.

6. The system of claim 1 in which one of said first and second compliant sections includes a plurality of elements extending along conical radii from a remote center of the remote center compliance device and said tool holder mechanism is disposed within the conical radii.

* * * * *